(12) United States Patent
Makioka

(10) Patent No.: US 8,040,419 B2
(45) Date of Patent: Oct. 18, 2011

(54) IMAGE REPRODUCING DEVICE CAPABLE OF ZOOMING IN A REGION OF AN IMAGE, IMAGE REPRODUCING METHOD AND RECORDING MEDIUM FOR THE SAME

(75) Inventor: Katsuya Makioka, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 657 days.

(21) Appl. No.: 11/790,241

(22) Filed: Apr. 24, 2007

(65) Prior Publication Data

US 2007/0285534 A1   Dec. 13, 2007

(30) Foreign Application Priority Data

Apr. 24, 2006   (JP) .................. 2006-119393

(51) Int. Cl.
*H04N 5/222* (2006.01)
*H04N 7/18* (2006.01)
*H04N 5/262* (2006.01)

(52) U.S. Cl. ............... 348/333.01; 348/161; 348/240.99

(58) Field of Classification Search ............. 348/240.99, 348/161, 152, 155, 240.1, 240.2, 240.3, 333.01, 348/333.02, 333.11; 382/115, 118
See application file for complete search history.

(56) References Cited

U.S. PATENT DOCUMENTS

| 7,376,347 | B2* | 5/2008 | Sugimoto | 396/60 |
| 7,536,028 | B2* | 5/2009 | Sumitomo | 382/103 |
| 2004/0145670 | A1* | 7/2004 | Hong | 348/333.01 |
| 2004/0239686 | A1* | 12/2004 | Koyama et al. | 345/620 |
| 2004/0258152 | A1* | 12/2004 | Herz | 375/240.16 |
| 2005/0219393 | A1* | 10/2005 | Sugimoto | 348/333.01 |
| 2005/0270399 | A1* | 12/2005 | Kawaguchi et al. | 348/333.11 |
| 2008/0163116 | A1* | 7/2008 | Lee et al. | 715/815 |

FOREIGN PATENT DOCUMENTS

| CN | 1691740 A | 11/2005 |
| EP | 1471455 A2 | 10/2004 |
| JP | 2004-193933 A | 7/2004 |
| JP | 2005-32219 A | 2/2005 |
| JP | 2005-318515 A | 11/2005 |
| JP | 2005-354333 A | 12/2005 |

* cited by examiner

*Primary Examiner* — Nicholas Giles

(74) *Attorney, Agent, or Firm* — Birch, Stewart, Kolasch and Birch, LLP

(57) ABSTRACT

According to the image reproducing device, the image reproducing method, the image reproducing program and the image capturing device of the present invention, if a face image is not detected in an image, a main object can be zoomed by detecting the center part of the image or a focused object. If a plurality of face images are detected from an image, the detected face images can be zoomed in order by simple operation.

14 Claims, 10 Drawing Sheets

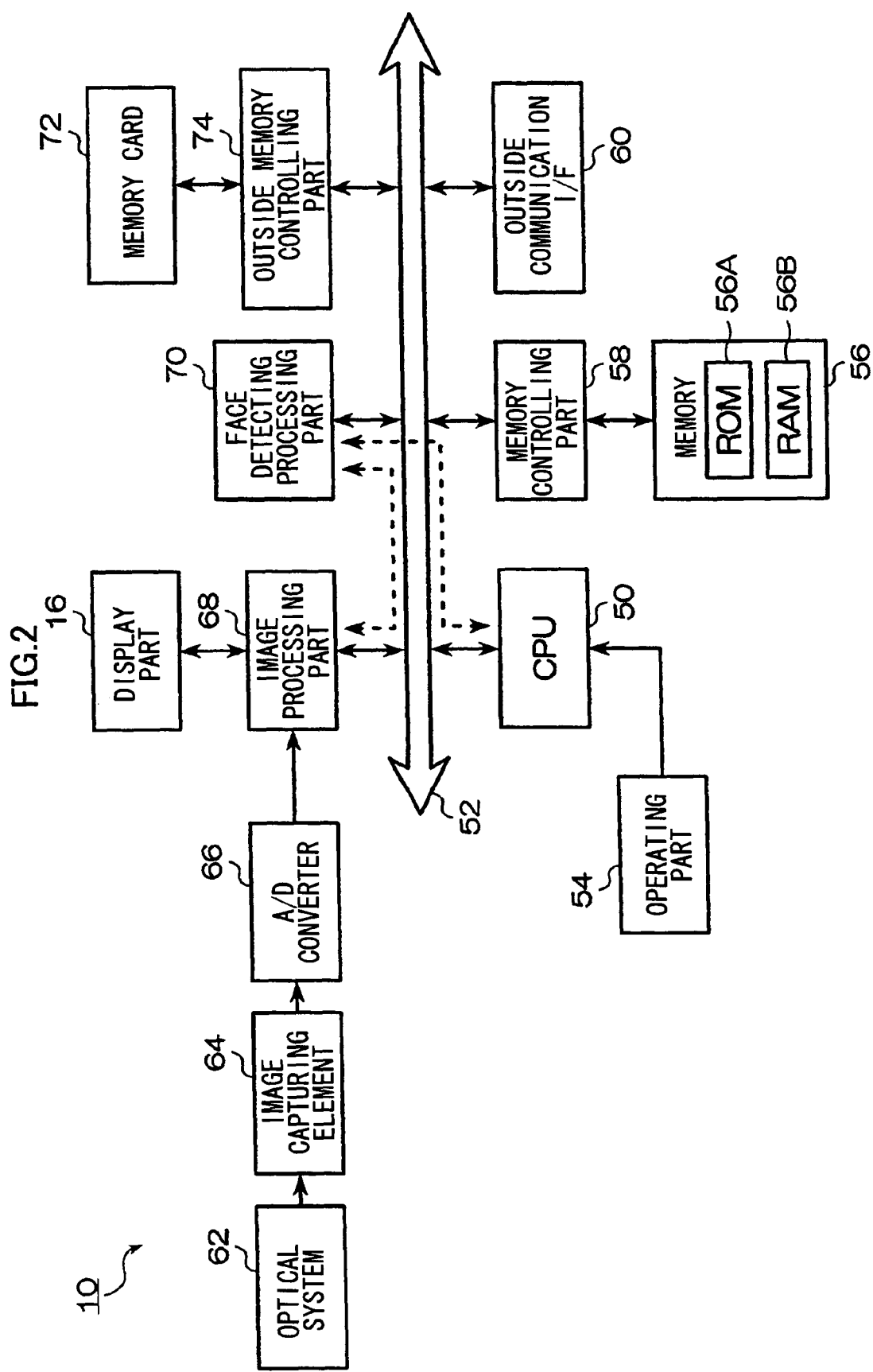

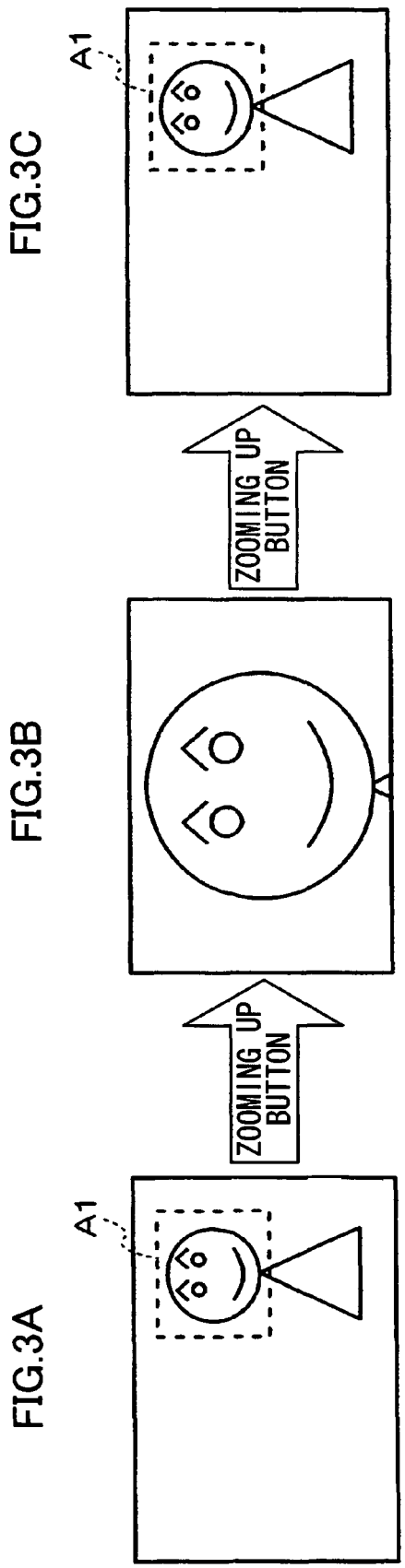

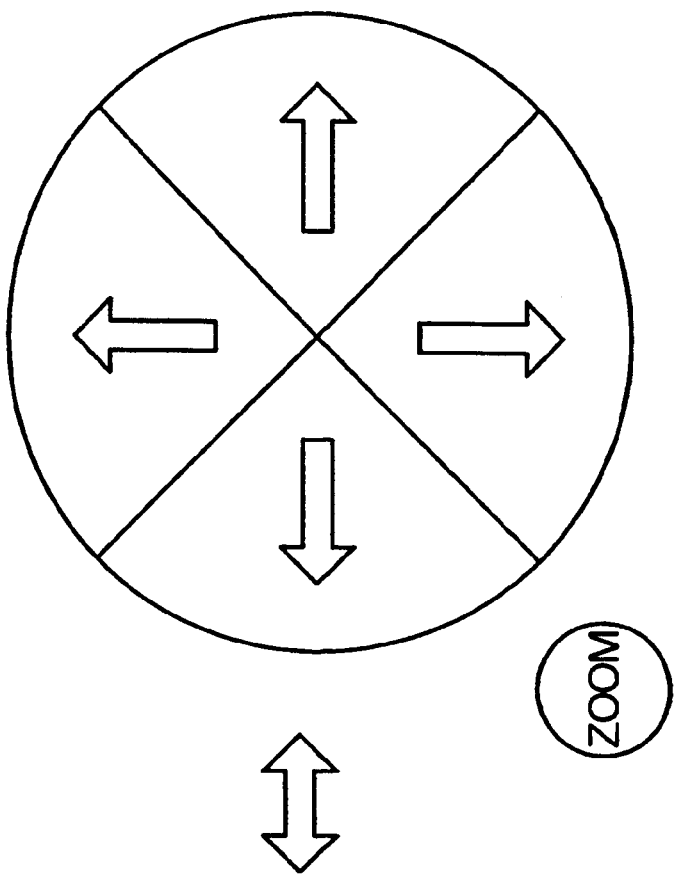
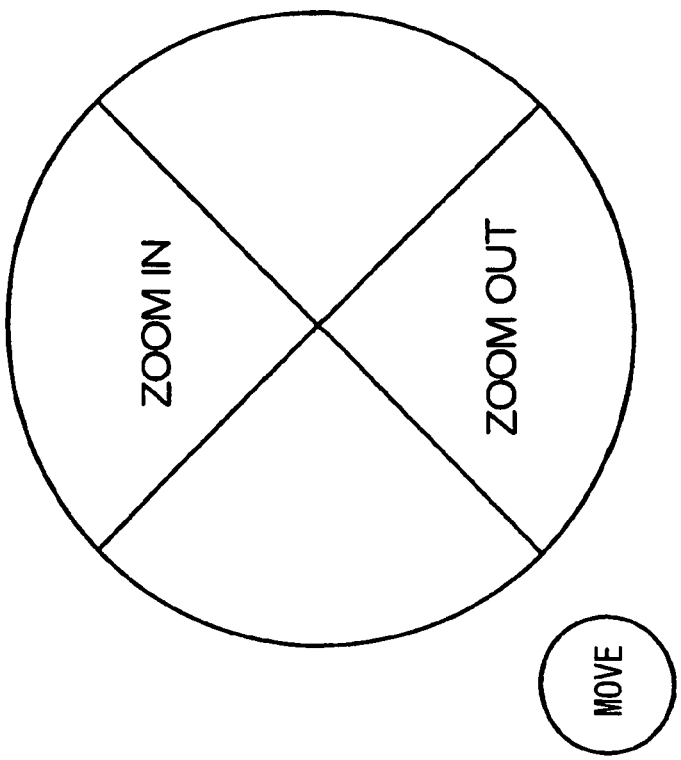

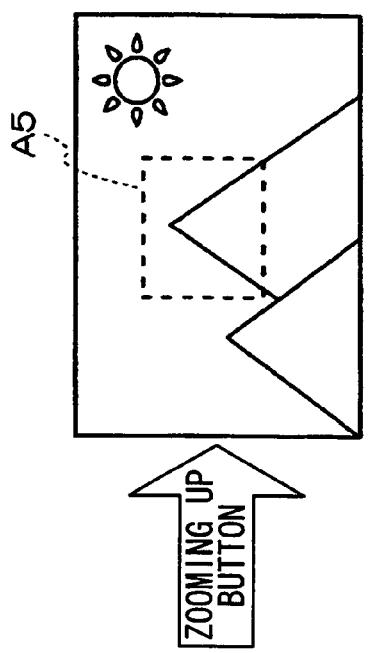
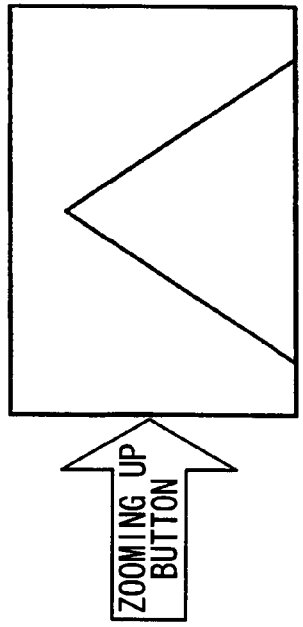
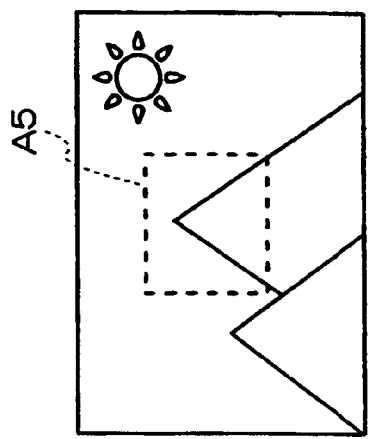

IMAGE REPRODUCING DEVICE CAPABLE OF ZOOMING IN A REGION OF AN IMAGE, IMAGE REPRODUCING METHOD AND RECORDING MEDIUM FOR THE SAME

BACKGROUND OF THE INVENTION

1. Field of the Invention

The present invention relates to an image reproducing device, an image reproducing method, an image reproducing program and an image capturing device, and specifically to a technique of zooming in a part of an image region.

2. Description of the Related Art

A digital still camera has been proposed including a face image detecting device for detecting a face image included in an object represented by image data output from an image capturing device, a zooming in instruction device for giving a zooming in instruction, a zooming in device for zooming in the face image detected by the face image detecting device when the zooming in instruction is given by the zooming in instruction device, and a first display controlling device for controlling the display device so that a face image zoomed in by the zooming in device on the display screen (Japanese Patent Application Laid-Open No. 2005-318515).

SUMMARY OF THE INVENTION

Japanese Patent Application Laid-Open No. 2005-318515 does not define processing in response to a zooming-in instruction when a face is not detected in a captured image (for example, if no face is taken, or if face detection is failed). Japanese Patent Application Laid-Open No. 2005-318515 has a problem in that if a plurality of faces are detected in an image, a face image needs to be specified by a specifying device in the face image displayed in association with the order of face images defined based on a predetermined factor in order to zoom in an image from a plurality of images, if a plurality of faces are detected in an image so that operation of the digital camera becomes quite complicated.

The present invention is adapted in view of the above circumstances, and intends to provide an image reproducing device, an image reproducing method, an image reproducing program and an image capturing device that can simplify operations involved in face zooming.

In order to solve the above-mentioned problem, an image reproducing device according to a first aspect of the present invention comprises an image acquiring device for acquiring an image, an image displaying device for displaying the image, a face image detecting device for detecting a face image included in the image, a zooming-in instruction device for giving a zooming in instruction, a first image zooming in device for zooming in the face image detected by the face image detecting device in response to the zooming in instruction given by the zooming in instruction device, a first display controlling device for controlling the image display device so that the face image zoomed by the first image zooming in device is displayed, a second image zooming in device for zooming in a predetermined region of the image according to the zooming in instruction given by the zooming in instruction device when the face image detecting device does not detect a face image in the image, and a second display controlling device for controlling the image display device so that the predetermined region zoomed by the second image zooming in device is displayed.

According to the first aspect of the present invention, if a face image is not detected, a part of an image can be zoomed in.

A second aspect of the present invention is the image reproducing device according to the first aspect, wherein the second image zooming in device zooms in a region including a center part of the image or a focused object in the image.

According to the second aspect of the invention, if a face image is not detected, a main object in the image can be zoomed in by detecting the center part of the image or the focused object.

An image reproducing device according to a third aspect of the present invention comprises an image acquiring device for acquiring an image, an image displaying device for displaying the image, a face image detecting device for detecting a face image included in the image, a zooming in instruction device for giving a zooming in instruction, an image zooming in device for zooming in a face image detected by the face image detecting device according to the zooming in instruction given by the zooming in instruction device, a determining device for determining whether a plurality of face images are detected by the face image detecting device or not, and a display control device for controlling the image display device so that the plurality of face images zoomed in by the image zooming in device are switched in a predetermined order and displayed according to the zooming in instruction given by the zooming in instruction device when the determining device determines that a plurality of face images are there.

According to the third aspect of the invention, the detected face image can be zoomed in in order only by repeatedly giving a zooming in instruction when a plurality of face images are detected in the image.

According to a fourth aspect of the invention, the image reproducing device of the third aspect further comprises an evaluation value calculating device for calculating an evaluation value about face likeliness of the face image detected by the face image detecting device, wherein the display control device displays the plurality of face images in the order of the evaluation value about the face likeliness.

According to the fourth aspect of the invention, face images can be zoomed in the descending or ascending order of the evaluation values about face likeliness.

A fifth aspect of the invention is the image reproducing device according to the third aspect, further comprising a face image size calculating device for calculating a size of the face image detected by the face image detecting device, wherein the display control device displays the plurality of face images in the order of the size.

According to the fifth aspect of the invention, face images can be zoomed in the descending or ascending order of the size of the face image.

A sixth aspect of the invention is the image reproducing device according to any one of the first to fifth aspects, further comprising a zooming in device for changing a scale of the zoomed image.

According to the sixth aspect of the invention, a user can check a zoomed image by a predetermined scale.

A seventh aspect of the invention is the image reproducing device according to any one of the first to sixth aspects, further comprising a moving device for moving a display region of the zoomed image.

According to the seventh aspect of the invention, a user can check images surrounding the zoomed image.

An image capturing device according to an eighth aspect comprises the image reproducing device according to any one of the first to seventh aspects.

According to the eighth aspect of the invention, an image capturing device that can reproduce a captured image by the above-mentioned image reproducing device can be realized.

An image reproducing method according to a ninth aspect comprises: an image acquiring step of acquiring an image, an image displaying step of displaying the image, a face image detecting step of detecting a face image included in the image, a zooming-in instruction step of giving a zooming in instruction, a first image zooming in step of zooming in the face image according to the zooming in instruction given by the zooming in instruction device, a first display controlling step of controlling so that the zoomed in face image is displayed, a second image zooming in step of zooming in a predetermined region of the image according to the zooming in instruction when a face image included in the image is not detected, and a second display controlling step of controlling the image display step so that the predetermined region zoomed is displayed.

A tenth aspect of the invention is the image reproducing method according to the ninth aspect, wherein a region including a center part of the image or an object focused in the image is zoomed in.

An image reproducing method according to an eleventh aspect comprises: an image acquiring step of acquiring an image, an image displaying step of displaying the image, a face image detecting step of detecting a face image included in the image, a zooming-in instruction step of giving a zooming in instruction, an image zooming in step of zooming in the face image according to the zooming in instruction, a determining step of determining whether a plurality of face images are detected or not, and, a display controlling step of controlling so that the plurality of zoomed in face images are switched in a predetermined order and displayed according to the zooming in instruction when it is determined that a plurality of images are detected.

A twelfth aspect of the invention is the image reproducing method according to the eleventh aspect, further comprising an evaluation value calculating step for calculating an evaluation value about face likeliness of the detected face image, and a step of displaying the plurality of face images in the order of the evaluation value about the face likeliness at the display controlling step.

A thirteenth aspect of the invention is the image reproducing method according to the eleventh aspect, further comprising a face image size calculating step of calculating a size of the detected face image and a step of displaying the plurality of face images in the order of the size at the display controlling step.

An image reproducing program according to a fourteenth aspect causes a computer to execute an image acquiring function of acquiring an image, an image displaying function of displaying the image, a face image detecting function of detecting a face image included in the image, a zooming-in instruction function of giving a zooming in instruction, a first image zooming in function of zooming in the face image according to the zooming in instruction, a first display controlling function of controlling so that the zoomed in face image is displayed, a second image zooming in function of zooming in a predetermined region of the image according to the zooming in instruction when a face image is not detected in the image, and a second display controlling function of controlling the image display device so that the predetermined region zoomed is displayed.

A fifteenth aspect of the invention is the image reproducing program according to the fourteenth aspect, wherein a region including a center part of the image or a focused object in the image is zoomed in by the second image zooming in function.

An image reproducing program according to a sixteenth aspect causes a computer to execute an image acquiring function of acquiring an image, an image displaying function of displaying the image, a face image detecting function of detecting a face image included in the image, a zooming-in instruction function of giving a zooming in instruction, an image zooming in function of zooming in the face image according to the zooming in instruction, a determining function of determining whether a plurality of face images are detected or not, and a display controlling function of controlling so that the plurality of zoomed in face images are switched in a predetermined order and displayed according to the zooming in instruction when it is determined that a plurality of images are detected.

A seventeenth aspect of the invention is the image reproducing program according to the sixteenth aspect, wherein the program causes the computer to execute an evaluation value calculating function of calculating an evaluation value about face likeliness of the detected face image and a function for displaying the plurality of face images in the order of the evaluation value in the display controlling function.

An eighteenth aspect of the invention is the image reproducing program according to the sixteenth aspect, wherein the program causes the computer to execute a face image size calculating function for calculating a size of the detected face image, and a function for displaying the plurality of face images in the order of the size.

A nineteenth aspect of the invention is the image reproducing program according to any one of the fourteenth to eighteenth aspects, wherein the program causes the computer to execute a scaling factor changing function for changing a scaling factor of the zoomed image.

A twentieth aspect of the invention is the image reproducing program according to any one of the fourteenth to nineteenth aspects, wherein the program causes the computer to execute a moving function for moving a displayed region of the zoomed image.

By applying the image reproducing program according to the fourteenth aspect to the twentieth aspect to a device with an image reproducing function such as an image capturing device (an electronic camera, a digital camera) or a PC (Personal Computer), a video reproducing device (video cassette recorder, television), a PDA, a portable photo player, or a cellular phone, the image reproducing device and the image reproducing method of the present invention can be realized.

According to the present invention, if a face image is not detected in an image, a main object can be zoomed by detecting a center part of the image or a focused object. If a plurality of face images are detected from an image, the detected face images can be zoomed in order by simple operation.

BRIEF DESCRIPTION OF THE DRAWINGS

FIG. 2 is a block diagram showing an electronic configuration of the image capturing device 10;

FIGS. 3A to 3C are diagrams showing transition of display when a face zooming in processing is performed;

FIGS. 6A and 6B are diagrams showing an example of a display of functions of the cross buttons 20;

FIGS. 8A to 8C are diagrams showing transition of a display when a face region is not detected;

DETAILED DESCRIPTION OF THE PREFERRED EMBODIMENTS

Preferred embodiments of the image reproducing device, the image reproducing method, the image reproducing program and the image capturing device according to the present invention will be described with reference to the attached drawings.

[Configuration of Image Capturing Device]

Figure 1:
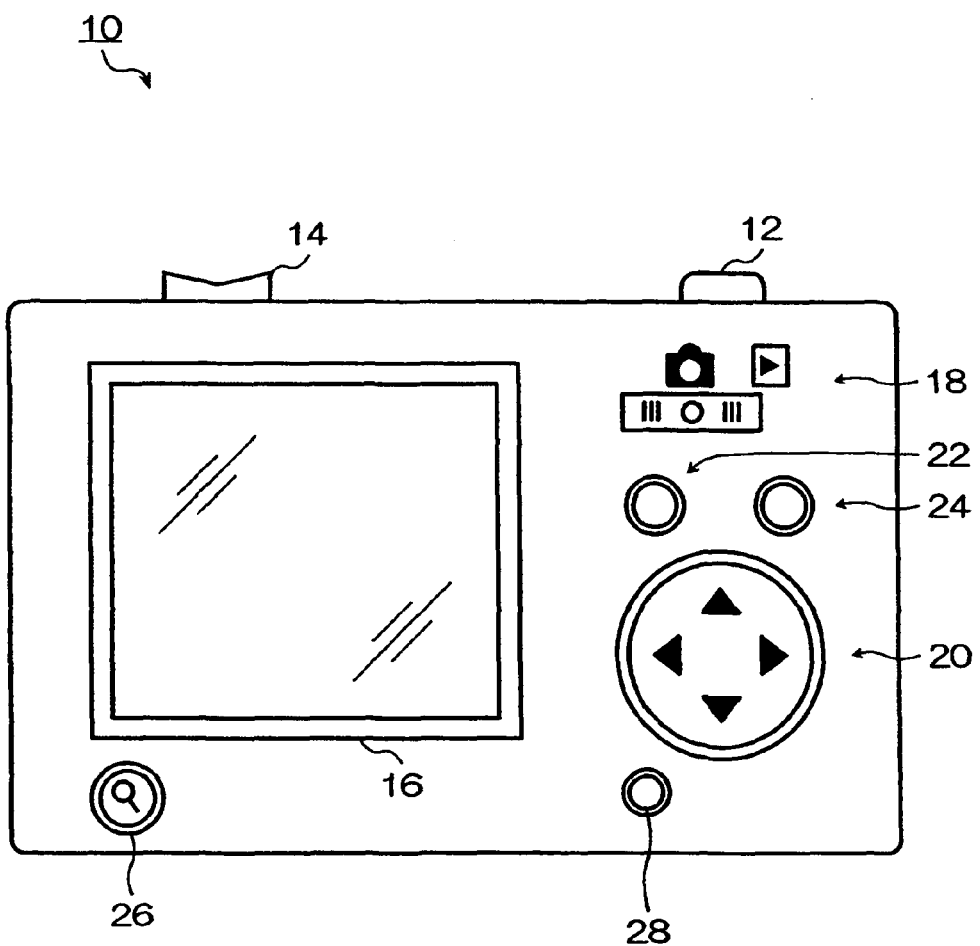
FIG. 1 is a plane diagram showing an appearance of the backside of an image capturing device with an image reproducing device according to an embodiment of the present invention.

FIG. 1 is a plane diagram showing an appearance of the backside of the image capturing device with the image reproducing device according to an embodiment of the present invention. As shown in FIG. 1, a release button 12 and a power switch 14 are provided on the top of the image capturing device (electronic camera) 10. A display part (monitor) 16, a mode switch 18, cross buttons 20, a MENU/OK button 22, a cancel button 24, a zoom-in button 26, a function switch 28 and the like are provided on the backside of the image capturing device 10. A battery cover is provided on the bottom of the camera body (not shown). Inside the battery cover, a battery storage room for the battery to be attached and a memory card slot for a memory card to be attached are provided.

The release button 12 functions as a button for inputting an instruction for capture an image with two-stage configuration. When it is in a state of "halfway pressed (S1=ON)" where the button is lightly pressed halfway down, automatic focusing (AF) and automatic exposure control (AE) operate to lock the AF and AE. When it is in a state of "all the way down pressed (S2=ON)" where the button is further pressed from the state of "halfway pressed", the image capturing is executed.

The power switch 14 includes a slide-out switch. With sliding-out operation of the power switch 14, the image capturing device 10 is powered ON/OFF.

The monitor 16 includes a color LCD. The monitor 16 is used for reproducing a captured image in the reproducing mode, and also used as an electronic finder with a through image is displayed in the image-capturing mode. A menu screen is displayed in each of the various operations to be used as a user interface for a user to operate various setting operations on it.

The mode switch 18 functions as a switch for switching the mode of the image-capturing device 10. According to the place the switch set, the mode is switched between the "image-capturing mode" for capturing a still image and the "reproducing mode" for reproducing a captured image.

The cross button 20 are adapted to be able to be pressed down in the directions in, down, left and right, to which functions according to the states of the image-capturing device 10 are allocated. In the image-capturing mode, the right button functions as a macro button for instructing to switch the macro mode, and the left button functions as a strobe button for instructing to switch the strobe mode. In the image-capturing mode, the in button functions as a zoom-television-button for instructing to zoom in the television direction, and the down button functions as a zoom wide button for instructing to zoom in the wide direction. In the reproducing mode, the right button functions as a button for instructing frame advance of an image, and the left button functions as a frame-back button for instructing frame back of an image. In the reproducing mode, the in button functions as a zooming-in button for instructing to zoom in the image, and the down button functions as a zooming-out button for instructing to zoom out the image. In various setting performed by using the monitor 16, the cross buttons 20 function as buttons for instructing to move a cursor displayed on the monitor 16.

The MENU/OK button 22 functions as a button for instructing to display a menu image on the monitor 16, and also functions as a button for instructing to execute various operations. The cancel button 24 functions as a button for instructing to cancel various operations.

The zooming in button 26 is a switch for inputting a zooming-in instruction for zooming in a face image included in the image displayed on the monitor 16. The function switching switch 28 is a switch for switching functions of the cross buttons 20 when a face image is zoomed in.

FIG. 2 is a block diagram showing an electrical configuration of the image-capturing device 10. As shown in FIG. 2, a CPU 50 is connected with each part in the image-capturing device 10 via a bus 52. It is an integrated controller for controlling over the operation of the image-capturing device 10 based on input operations from an operation part 54 or the like. The operation part 54 is an operation member for receiving input operations from a user, including the release button 12, the power switch 14, the mode switch 18, the cross buttons 20 and the like.

The memory 56 is controlled by the memory controlling part 58, having a ROM 56A storing a program processed by the CPU 50 and various types of data and the like required the control, and a RAM 56B for serving as a work area and an image processing area for the CPU 50 to perform various calculations and the like. The ROM 56A stores data for detecting a face image (for example, image data of face samples).

An external communication interface part (external communication I/F) 60 is an appliance for connecting with a network, an external output appliance (for example, a personal computer, a television, a display, a printer, an external recording device and the like). It sends and receives various types of data according to a predetermined protocol. As a data exchanging method, for example, a USB, IEEE 1394, a wired LAN, an infrared communication (IrDA) and the like can be used.

An image-capturing element 64 is an element for receiving an incident light via an optical system (lens) 62 and converting it into an electrical signal. It includes a CCD image sensor or a CMOS image sensor. The electrical signal is amplified by a preamp (not shown), converted into a digital signal by A/D converter 66, and inputted into the image processing part 68.

As mentioned above, the image-capturing device 10 has two modes: an image-capturing mode for capturing an image and a reproducing mode for displaying and reproducing a captured image. In the image-capturing mode, the electrical signal output from the image-capturing element 64 is input into the image processing part (digital signal processing part) 68, subjected to gummer correction or white balance correction by the image processing part 68 to create image data (through image) for checking image angle. The image data (through image) is output to the display part (monitor) 16 as image signals by the image processing part 68. Accordingly, the through image is displayed on the monitor 16.

When the release button 12 is halfway pressed, the image signal is input into the CPU 50, the AF and the AE actuated, the zoom lens and the focus included in the optical system 62 are driven to lock the AF and the AE. Then, when the release button 12 is pressed all the way, the image-capturing is performed. After the image is captured, the electrical signal output from the image-capturing element 64 is processed by the image processing part 68 and the image file for storing is created. The image file for storing is stored in the memory card 72 in a predetermined file format. Here, the memory card 72 is a semiconductor memory and the like. Input and output to and from the memory card 72 is controlled by the external memory controlling part 74.

The image signal output from the image processing part 68 when a through image is displayed or when an image is captured, is also input in the face detecting processing part 70. The face detecting processing part 70 detects a face region of a person taken in the image by a face recognition technique. As an example of a method for detecting a face region, a method for retrieving a pixel with a color near the color that is specified for a skin color from the original image, and detecting the retrieved region as a face region is known. The processing is performed in such a way as a range for the skin color on a color space is defined from information of the skin color that sampled in advance on the color space for distinguishing the skin color from the other colors, and whether a color of each pixel is included in the defined range or not is determined. Position information of the face region detected by the face detecting processing part 70 is output to the CPU 50. The evaluation value indicating likeliness of a face in the face region (face likeliness) and the size of the face (an area of a rectangular region including a face image or an area of the face) are also calculated by the face detecting processing part 70 and output to the CPU 50. Here, face likeliness is a parameter for indicating whether a region detected by the face detecting processing part 70 is a face region or not. It is calculated by the degree of the skin color. The face detecting processing part 70 calculates the face likeliness for each skin color region detected from an image and decides the skin color region whose face likeliness is at the predetermined value or mote is the face region.

If the zooming-in button 26 is pressed when the through image or the captured image is displayed, a zooming-in instruction is input into the CPU 50. When a face region is detected by the face detecting processing part 70, the CPU 50 zooms in the face region and displays it on the monitor 16 based on the place information of the face region input from the face detecting processing part 70 in response to the input of the zooming-in instruction. Here, if a plurality of face regions are detected, the CPU 50 switches the zoomed-in display of the face region in a predetermined order each time the zooming-in instruction is input. The order to zoom the face regions is decided by the face likeliness or the size of the face region. If the face region is not detected by the face detecting processing part 70, the CPU 50 zooms a predetermined region of the image (a region including the center of the image or the focus of the image) according to the input of the zooming-in instruction 70 and displays it on the monitor 16.

In the reproducing mode, the data stored by the image processing part 68 in the memory card 72 is read out and the image data for display is created. The image data for display is output on the monitor 16 as image signals. Accordingly, an image in the memory card 72 is read out and displayed on the monitor 16.

If the zooming button 26 is pressed in the reproducing mode, the image read out from the memory card 72 is also input into the face detecting processing part 70 and a region including a face (face region) in the image is detected. If the zooming button 26 is pressed when the image is displayed, the zooming instruction is input to the CPU 50. When the face detecting processing part 70 detects a face region, the CPU 50 zooms in the face region according to the zooming-in instruction and displays it on the monitor 16. If the face detecting processing part 70 does not detect a face region, the CPU 50 zooms in a predetermined region (for example, a region including the center of the image or the focus of the image) in the image according to the input of the zooming-in instruction and displays it on the monitor 16.

In the embodiment, a meta-data (for example, in the xml form) for storing information on the face region of the image subjected to the face detection (for example, a place in the image, face likeliness, or the size) may be created and stored in the memory card 72. Information on the face region may be stored in the image as tag information. If the information on the face region is stored in the meta-data or the like, for example in the reproducing mode, the CPU 50 can acquire information on the face region from the meta-data or the like without controlling the face detecting processing part 70 and detecting a face region.

[Face Zooming Processing]

Figure 4A:
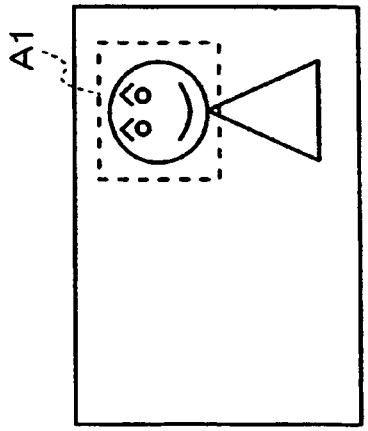
FIGS. 4A to 4C are diagrams showing transition of display when a face zooming in processing is performed.
Figure 4B:
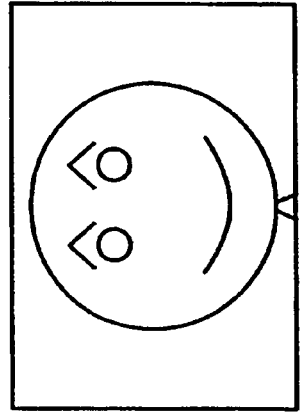

The face zooming processing will be described below. FIG. 3 to FIG. 5 are diagrams showing transition of display in face zooming processing. As shown in FIG. 3A, if a face region A1 is detected from the displayed image, the face region A1 is zoomed in on the monitor 16 in response to the pressing of the zooming button 26. As shown in FIG. 3B, when the face image is zoomed in, the face region A1 is zoomed in so that the center of face region A1 matches the center of the monitor 16. The face region A1 is zoomed in so that the size of the face region A1 is the biggest size to be contained in the monitor 16. When the zooming-in button 26 is pressed again, the display returns to the original image display as shown in FIG. 3C.

Figure 4C:
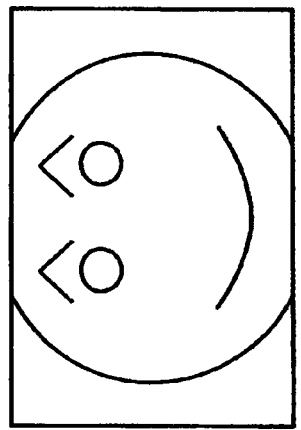
Figure 5A:
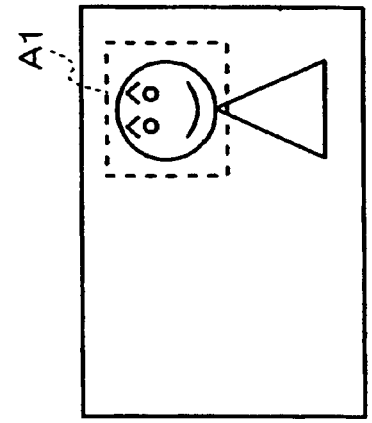
FIGS. 5A to 5C are diagrams showing transition of display when a face zooming in processing is performed.
Figure 5B:
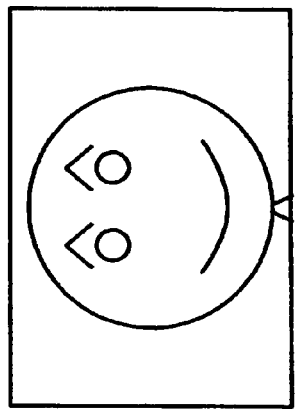
Figure 5C:
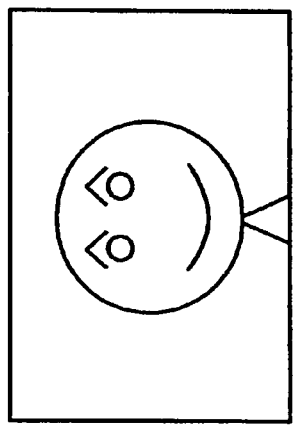

If the up button of the cross button 20 is pressed while a face region is zoomed in (FIG. 4B), the scaling factor for zooming in the face region increases (zoomed in) according to the time period for pressing of the up button as shown in FIG. 4C. If the down button of the cross button 20 is pressed while a face region is zoomed in (FIG. 5B), the scaling factor for zooming in the face region decreases (zoom out) as shown in FIG. 5C. If the function switching switch 28 is pressed while a face region is zoomed as shown in FIG. 3B or the like, the cross button 20 functions as buttons for moving a region zoomed in on the monitor 16 and the region to be zoomed in moves in response to pressing of the up, down, left and right buttons. An indication of functions of the cross buttons 20 is displayed in a zooming-in display of a face region shown in FIG. 3B or the like. FIGS. 6A and 6B are diagrams showing an example of a display of the functions of the cross buttons 20. In an example shown in FIGS. 6A and 6B, functions of the cross button 20 and the function switching switch 28 are displayed on the simulating images at the bottom of the monitor 16, for example, so as not to be superimposed on the zoomed display of the face image or superimposed translucently on the display. As shown in FIG. 6A, if the cross button 20 functions as a zoom button for changing the scaling factor of the image, "ZOOM IN" and "ZOOM OUT" are displayed at places corresponding to the up button and the down button of the cross button 20, respectively. As shown in FIG. 6A, an indication telling that it is the button for switching the function of the cross buttons 20 to the moving button in the display region is displayed at a place corresponding to the function switching switch 28. If the cross button 20 is switched to the moving button, codes (allows) indicating directions of movement are displayed at the places corresponding to the up, down, left and right buttons of the cross buttons 20 respectively as shown in FIG. 6B. As shown in FIG. 6B, an indication telling that it is the button for switching the function of the cross button 20 to the zoom button is displayed at the place corresponding to the function switching switch 28.

Figure 7A:
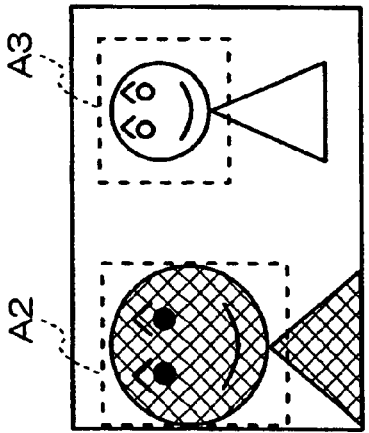
FIGS. 7A to 7C are diagrams showing transition of a display when a plurality of face regions are displayed.
Figure 7B:
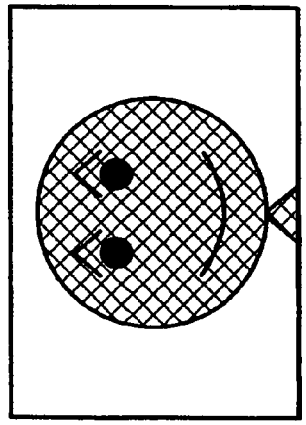
Figure 7C:
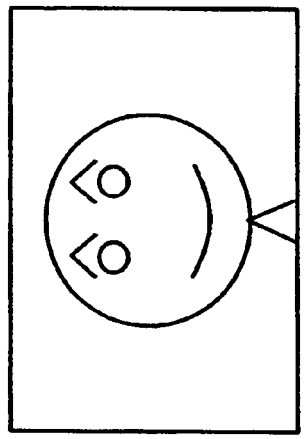

FIGS. 7A to 7C are diagrams showing transition of the display when a plurality of face regions are detected. As shown in FIG. 7A, if two face regions are detected from the displayed image, the face region A2 with the higher face likeliness among the detected face regions A2/A3 is selected and zoomed in response to pressing of the zooming-in button 26 (FIG. 7B). When the zooming-in button 26 is pressed again, the face region A3 with the second high face likeliness is selected and zoomed (FIG. 7C). After all the images have been displayed as the zooming-in button 26 is repeatedly pressed down and the zooming-in button 26 is pressed again, the display returns to the original display of the image (FIG. 7A). The order of displaying the face region may be ascending order of the face likeliness, descending or ascending order of the size of the face region.

FIGS. 8A to 8C are diagrams showing transition of a display when a face region is not detected. As shown in FIG. 8A, if a face region is not detected in the displayed image, the center part A5 of the image is zoomed and displayed on the monitor 16 by the CPU 50 in response to pressing down of the zooming-in button 26 (FIG. 8B). In FIG. 8B, by using the cross buttons 20, zoom-in/zoom-out or moving of the displayed region can be done. When the zooming-in button 26 is pressed again, as shown in FIG. 8C, the display returns to the original display of the image. If a face region is not detected, an object that is focused by the CPU 50 instead of the center part A5 of the image may be detected so that a region included in the focused object is zoomed in. If the center part A5 or the focused object is to be zoomed in, the center part A5 or the center of the object only needs to be displayed at the center of the monitor 16. If the region including the focused object is zoomed in, the focused object only needs to be zoomed in so as to be the biggest size to be in the monitor 16, for example, by detecting a color of the object.

FIRST EMBODIMENT OF FACE ZOOMING-IN PROCESSING

Figure 9:
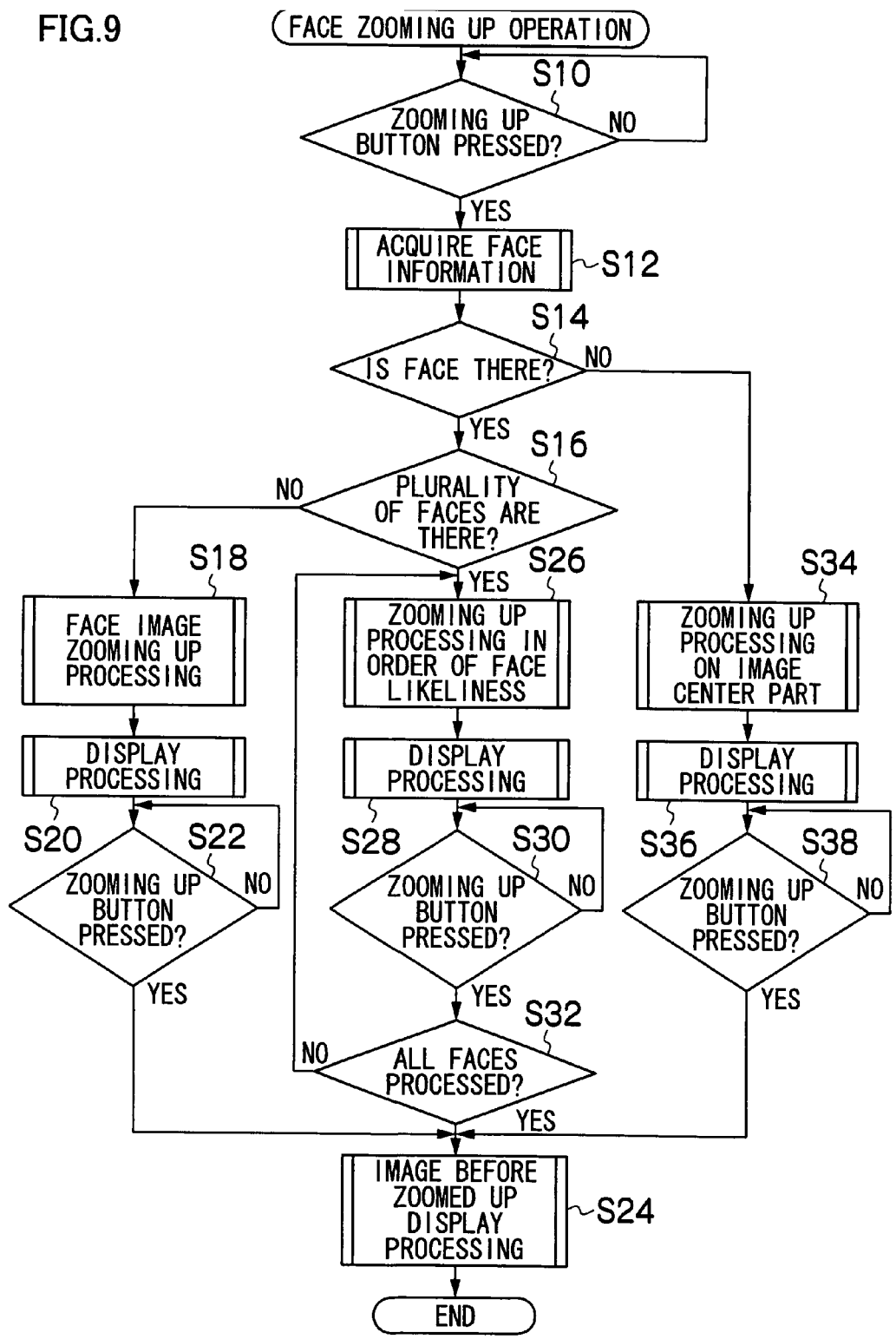
FIG. 9 is a flowchart showing a flow of the face zooming in processing.

FIG. 9 is a flowchart showing a flow of a face zooming-in processing. First, when the zooming-in button 26 is pressed (Yes of the step S10), the CPU 50 acquires face information from the meta-data or the like stored in the face detecting processing 70 or the memory card 72 (step S12). If a face region is detected in the image (Yes at the step S14, No at the step S16), the CPU 50 zooms in the face region (step S18) and the zoomed in face region is displayed on the monitor 16 (step S20, FIG. 3B). When the zooming-in button 26 is pressed again (Yes at the step S22), the display returns to the display of the previous image (step S24, FIG. 3C).

If a plurality of face regions are detected from an image (Yes at the step S14, Yes at the step S16), a face region with the highest face likeliness among the detected face regions is zoomed in by the CPU 50 (step S26), and the zoomed-in face region is displayed on the monitor 16 (step S28, FIG. 7B). When the zooming-in button 26 is pressed down again (Yes at the step S30), the face-region with the second highest face likeliness is zoomed in by the CPU 50 (step S26) and the zoomed in face region is displayed on the monitor 16 (step S28). The processing from the step S26 to the step S32 is repeated and all the face regions have been displayed (Yes at the step S32), the display returns to the display of the image before zoomed in (step S24, FIG. 7A).

If a plurality of face regions are not detected in the image (No at the step S14), the CPU 50 zooms in the center part of the image (step S34) and the center part of the zoomed-in image is displayed on the monitor 16 (step S36, FIG. 8B). When the zooming-in button 26 is pressed down again (Yes at the step S38), the display returns to the display of the image before zoomed in (step S24, FIG. 8C).

According to the embodiment, if a plurality of face regions are detected in an image, the face images can be zoomed in in order only by repeatedly pressing down the zooming in button 26. According to the embodiment, if a face image is not detected in the image, a main object can be zoomed in by detecting the center of the image or the focused object.

SECOND EMBODIMENT OF FACE ZOOMING IN PROCESSING

Figure 10:
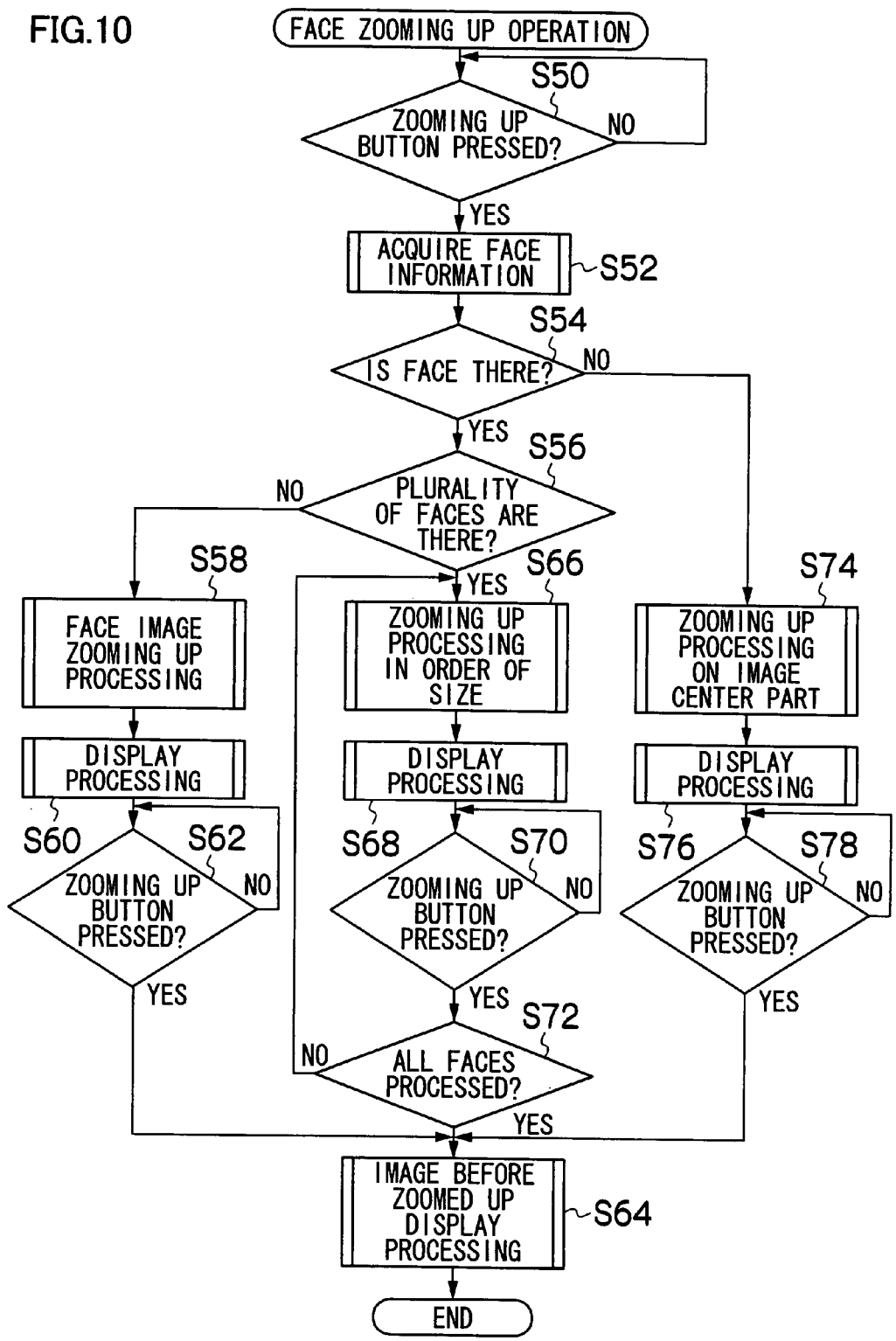
FIG. 10 is a flowchart showing another embodiment of the face zooming in processing.

FIG. 10 is a flowchart showing another embodiment of face zooming in processing. Processes from the steps S50 to S64 and from the steps S74 to S64 are the same as those from the steps S10 to S24 and the step S34 to S24 in FIG. 9, they are omitted from the description. In the embodiment, if a plurality of face regions are detected (Yes at the step S54, Yes at the step S56), the face region is zoomed in the order of the size of the face from the steps S66 to S72.

Although a plurality of face regions are switched each time the zooming-in button 26 is pressed in each of the above embodiments, it is also possible that consecutive display of face regions is automatically executed in response to the first pressing of the zooming-in button 26 and zooming in of the face region finishes in response to the second pressing of the zooming-in button 26.

It is also possible that the zoomed in face region is trimmed and stored in the memory card 72.

The image reproducing device of the present invention can not only be applied to the above-mentioned image capturing device but also to the device with an image reproducing function such as personal computer (PC), a video reproducing device (video cassette recorder, television), a personal digital assistant (PDA), a portable photo player, a cellular phone and the like. By applying a software program or a firmware for executing the above-mentioned processing to the device with an image reproducing function such as an image capturing device (an electronic camera, a digital camera) or a PC, a video reproducing device (video cassette recorder, television), a PDA, a portable photo player, a cellular phone and the like, the image reproducing device and the image reproducing method of the present invention can be realized.

What is claimed is:

1. An image reproducing device comprising:
   an image acquiring device configured to acquire an image;
   an image displaying device configured to display the image;
   a face image detecting device configured to detect a face image included in the image;
   a zooming-in instruction device configured to give a zooming in instruction;
   a first image zooming in device configured to zoom in the face image detected by the face image detecting device in response to the zooming in instruction given by the zooming in instruction device;
   a first display controlling device configured to control the image display device so that the face image zoomed by the first image zooming in device is displayed;
   a second image zooming in device configured to zoom in a predetermined region of the image according to the zooming in instruction given by the zooming in instruction device when the face image detecting device does not detect a face image in the image, wherein the second image zooming in device zooms in a region including a center part of the image or a focused object in the image, and, when the region including the focused object is zoomed in, the focused object is only zoomed in so as to be the biggest size to be in the image displaying device based on a detected color of the focused object;

a second display controlling device configured to control the image display device so that the predetermined region zoomed by the second image zooming in device is displayed;

an operation member; and a function switching device configured to switch functions of the operation member between a first function of adjusting a scaling factor for zooming in the region and a second function of moving the region to be zoomed in, according to an instruction inputted by a user, wherein:

an indication of function of the operation member is displayed on the image displaying device, and a first indication indicating that the function switching device is configured to switch the function of the operation member to the second function when the function of the operation member is switched to the first function is displayed on the image displaying device, and a second indication indicating that the function switching device is configured to switch the function of the operation member to the first function when the function of the operation member is switched to the second function is displayed on the image displaying device.

2. The image reproducing device according to claim 1, further comprising:
a zoom in device configured to change a scale of the zoomed in image.

3. The image reproducing device according to claim 2, further comprising:
a moving device configured to move a display region of the zoomed image.

4. The image reproducing device according to claim 1, further comprising:
a moving device configured to move a display region of the zoomed image.

5. The image reproducing device according to claim 1, wherein
the first and second indications are displayed at a place corresponding to the function switching device on the image displaying device.

6. An image capturing device comprising the image reproducing device according to claim 1.

7. An image capturing device comprising the image reproducing device according to claim 3.

8. An image reproducing method comprising:
an image acquiring step of acquiring an image;
an image displaying step of displaying the image on an image displaying device;
a face image detecting step of detecting a face image included in the image;
a zooming-in instruction step of giving a zooming in instruction;
a first image zooming in step of zooming in the face image according to the zooming in instruction;
a first display controlling step of controlling so that the zoomed in face image is displayed;
a second image zooming in step of zooming in a predetermined region of the image according to the zooming in instruction when a face image is not detected in the image, wherein a region including a center part of the image or an object focused in the image is zoomed in, and, when the region including the focused object is zoomed in, the focused object is only zoomed in so as to be the biggest size to be in the image displaying device based on a detected color of the focused object;

a second display controlling step of controlling the image display step so that the predetermined region zoomed is displayed;

a function switching step of switching functions of an operation member between a first function of adjusting a scaling factor for zooming in the region and a second function of moving the region to be zoomed in, according to an instruction inputted by a user;

an indication displaying step of displaying an indication of function of the operation member on the image displaying device; and an indication displaying step of displaying a first indication indicating that the function switching device is configured to switch the function of the operation member to the second function when the function of the operation member is switched to the first function on the image displaying device, and displaying a second indication indicating that the function switching device is configured to switch the function of the operation member to the first function when the function of the operation member is switched to the second function on the image displaying device.

9. The image reproducing method according to claim 8, wherein
the first and second indications are displayed at a place corresponding to the function switching device on the image displaying device.

10. A non-transitory computer-readable recording medium including instructions of an image reproducing program stored thereon, such that when the instructions are read and executed by a processor, the processor is configured to perform the steps of:
acquiring an image;
displaying the image on an image displaying device;
detecting a face image included in the image;
giving a zooming in instruction;
zooming in the face image according to the zooming in instruction;
controlling so that the zoomed in face image is displayed;
zooming in a predetermined region of the image according to the zooming in instruction when a face image is not detected in the image, wherein a region including a center part of the image or a focused object in the image is zoomed in, and, when the region including the focused object is zoomed in, the focused object is only zoomed in so as to be the biggest size to be in the image displaying device based on a detected color of the focused object;
controlling the image display device so that the predetermined region zoomed is displayed;
switching functions of an operation member between a first function of adjusting a scaling factor for zooming in the region and a second function of moving the region to be zoomed in, according to an instruction inputted by a user;
displaying an indication of function of the operation member on the image displaying device; and
displaying a first indication indicating that the function switching device is configured to switch the function of the operation member to the second function when the function of the operation member is switched to the first function on the image displaying device, and displaying a second indication indicating that the function switching device is configured to switch the function of the operation member to the first function when the function of the operation member is switched to the second function on the image displaying device.

11. The recording medium according to claim 10, wherein the processor is configured to perform the steps of:
    changing a scaling factor of the zoomed image.

12. The recording medium according to claim 11, wherein the processor is configured to perform the steps of:
    moving a displayed region of the zoomed image.

13. The recording medium according to claim 10, wherein the processor is configured to perform the steps of:
    moving a displayed region of the zoomed image.

14. The recording medium according to claim 10, wherein the first and second indications are displayed at a place corresponding to the function switching device on the image displaying device.

* * * * *